United States Patent
Carlise et al.

(10) Patent No.: US 10,392,573 B2
(45) Date of Patent: *Aug. 27, 2019

(54) METHOD OF CONTROLLING GAS HYDRATES IN FLUID SYSTEMS

(75) Inventors: Joseph R. Carlise, Lisle, IL (US); Olga E. S. Lindeman, Brookfield, WI (US); Peter E. Reed, Plainfield, IL (US); Peter G. Conrad, Sugar Land, TX (US); Leonard M. Ver Vers, Downers Grove, IL (US)

(73) Assignee: Ecolab USA Inc., St. Paul, MN (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/253,529

(22) Filed: Oct. 17, 2008

(65) Prior Publication Data

US 2010/0099807 A1 Apr. 22, 2010

(51) Int. Cl.
  *C10L 3/00* (2006.01)
  *C10L 3/10* (2006.01)
  *C08F 20/56* (2006.01)

(52) U.S. Cl.
  CPC .............. *C10L 3/003* (2013.01); *C10L 3/10* (2013.01); *C10L 3/107* (2013.01); *C08F 20/56* (2013.01)

(58) Field of Classification Search
  CPC ........... C10L 3/003; C10L 3/107; C08F 20/56
  USPC .............. 524/376; 526/95, 100, 209, 303.1
  See application file for complete search history.

(56) References Cited

U.S. PATENT DOCUMENTS

| | | | |
|---|---|---|---|
| 3,317,556 A | | 5/1967 | Rose et al. |
| 3,894,962 A | | 7/1975 | Allain |
| 4,081,402 A | * | 3/1978 | Levy et al. ............ 428/36.4 |
| 4,652,623 A | | 3/1987 | Chen et al. |
| 4,673,716 A | * | 6/1987 | Siano et al. ............... 525/367 |
| 4,980,378 A | | 12/1990 | Wong et al. |
| 5,348,997 A | * | 9/1994 | Kato et al. ............... 524/189 |
| 5,681,889 A | * | 10/1997 | Kondo et al. ............. 524/502 |
| 6,177,497 B1 | | 1/2001 | Klug et al. |
| 6,194,622 B1 | | 2/2001 | Peiffer et al. |
| 6,319,971 B1 | | 11/2001 | Kelland et al. |
| 6,451,891 B1 | | 9/2002 | Thieu et al. |
| 6,559,233 B2 | * | 5/2003 | Bavouzet et al. .......... 525/244 |
| 6,702,946 B1 | | 3/2004 | Huang et al. |
| 6,878,788 B2 | * | 4/2005 | Angel et al. ............... 526/264 |
| 7,311,144 B2 | | 12/2007 | Conrad |
| 7,408,004 B2 | | 8/2008 | Struck et al. |
| 7,550,339 B2 | | 6/2009 | Forbes |
| 2003/0130454 A1 | * | 7/2003 | Seya et al. ................. 526/207 |
| 2004/0024152 A1 | * | 2/2004 | Toyama et al. ............ 526/227 |
| 2005/0113541 A1 | * | 5/2005 | Tsumori et al. ........... 526/317.1 |
| 2006/0094913 A1 | | 5/2006 | Spratt |
| 2006/0205603 A1 | * | 9/2006 | Colle et al. ................ 507/90 |
| 2008/0113890 A1 | | 5/2008 | Moreton et al. |
| 2010/0008733 A1 | | 1/2010 | Stiesdal |
| 2010/0222239 A1 | | 9/2010 | Acosta et al. |

FOREIGN PATENT DOCUMENTS

| | | |
|---|---|---|
| GB | 962242 | 7/1964 |
| WO | 99/64718 | 12/1999 |
| WO | 02/40433 A1 | 5/2002 |
| WO | 2004032824 | 4/2004 |
| WO | 2004041884 | 5/2004 |
| WO | 2005/005567 A1 | 1/2005 |
| WO | 2006/051265 A1 | 5/2006 |
| WO | 2008089262 | 7/2008 |

OTHER PUBLICATIONS

"Basic Physical Properties of Chemical Compounds", Knovel Critical Tables, 2008, second edition.*
Pellenbarg et al., "Introduction, Physical Properties, and Natural Occurences of Hydrate", Natural Gas Hydrate in Oceanic and Permafrost Environments, 2000, pp. 1-8.*
Graham, "Promoter Action in Reactions of Oxidation Concomitant with the Catalytic Decomposition of Hydrogen Peroxide, 1. The Oxidation of Hydrazine", J. Am. Chem. Soc., 1930, vol. 52, pp. 3035-3045.*
Sharma et al., "Green and mild protocol for hetero-Michael addition of sulfur and nitrogen nucleophiles in ionic liquid", Journal of Molecular Catalyasis, A: Chemical, 277, pp. 215-220, 2007.
V. Fedi et al, Inseration of an Aspartic Acid Moiety into Cyclic Pseudopeptides: Synthesis and Biological Characterization of Potent Antagonists for the Human Tachykinin NK-2 Receptor, Journal of Medicinal Chemistry, vol. 47, pp. 6935-6947, 2004.
Billmeyer, F., Textbook of Polymer Science, John Wiley & Sons, Inc., 3rd edition, p. 5, 1984.
Yadav, J.S. et al., "Synthesis", No. 22, pp. 3447-3450, 2007.
Young, D., et al., "Spawning Distribution of Sockeye Salmon in a Glacially Influenced Watershed: the Importance of Glacial Habitats," Transactions of the American Fisheries Society, 2007, 136, pp. 452-459.
Alger, M., Definition of "Chain Transfer Agent," Polymer Science Dictionary, Second Edition, 1997, p. 80, Chapman & Hall.
Braun, Cherdron; Kern: Praktikum der Makromolekularen Chemie, 1979, pp. 155-158 and 173-175, XP002565435, Alfred Huthig Verlag, Heidelberg.

* cited by examiner

*Primary Examiner* — Nicole M. Buie-Hatcher
(74) *Attorney, Agent, or Firm* — Stinson LLP

(57) ABSTRACT

A method of inhibiting hydrates in a fluid comprising water and gas comprising adding to the fluid an effective hydrate-inhibiting amount of a composition comprising one or more homo- or co-polymers of N-alkyl(alkyl)acrylamide synthesized by polymerizing one or more N-alkyl(alkyl)acrylamide monomers in a solvent comprising a glycol ether of formula $CH_3-(CH_2)_m-(O-CH_2-CH_2)_n-OH$ where m is an integer of 0-1, and n is an integer $\geq 1$.

24 Claims, No Drawings

METHOD OF CONTROLLING GAS HYDRATES IN FLUID SYSTEMS

TECHNICAL FIELD

This invention relates to inhibiting the formation and growth of hydrate particles in fluids containing hydrocarbon gas and water, particularly in the production and transport of natural gas, petroleum gas or other gases by treatment with a glycol ether solution of a N-alkyl(alkyl)acrylamide homopolymer or copolymer.

BACKGROUND OF THE MENTION

Modern oil and gas technologies commonly operate under severe conditions during the course of oil recovery and production. For instance, high pumping speed, high pressure in the pipelines, extended length of pipelines, and low temperature of the oil and gas flowing through the pipelines. These conditions are particularly favorable for the formation of gas hydrates, which can be significantly hazardous for oil productions offshore or for locations with cold climates.

Gas hydrates are ice-like solids that are formed from small nonpolar molecules and water at lower temperatures and at increased pressures. Under these conditions, the water molecules can form cage-like structures around these small nonpolar molecules (typically dissolved gases such as carbon dioxide, hydrogen sulfide, methane, ethane, propane, butane and iso-butane), creating a type of host-guest interaction also known as a clathrate or clathrate hydrate. The specific architecture of this cage structure can be one of several types (called type 1, type 2, type H), depending on the identity of the guest molecules. However once formed, these crystalline cage structures tend to settle out from the solution and accumulate into large solid masses that can travel by oil and gas transporting pipelines, and potentially block or damage the pipelines and or related equipment. The damage resulting from a blockage can be very costly from an equipment repair standpoint, as well as from the loss of production, and finally the resultant environmental impact.

The petroleum industry gives particular attention to clathrate hydrates because the conditions are often favorable for the formation of hydrates and subsequent blockages. There are many instances where hydrate blockages have halted the production of gas, condensate, and oil. Obviously, the monetary consequences for each of these instances are amplified when considering the volumes of production in deepwater applications where tens of thousands of barrels of oil are routinely produced daily and the shut-ins can take months to remedy. Additionally, restarting a shutdown facility, particularly in deep water production or transportation facility, is extremely difficult because of the significant amounts of time, energy, and materials, as well as the various engineering implementations that are often required to remove a hydrate blockage under safe conditions.

The industry uses a number of methods to prevent blockages such as thermodynamic hydrate inhibitors (THI), anti-agglomerates (AA), and kinetic hydrate inhibitors (KHI). The amount of chemical needed to prevent blockages varies widely depending upon the type of inhibitor that is employed. Thermodynamic hydrate inhibitors are typically used at very high concentrations (glycol is often used in amounts as high as 100% of the weight of the produced water), while KHI's and AA's are used at much lower concentrations (0.3-0.5% active concentration) and are typically termed low dose hydrate inhibitors (LDHIs).

Commonly it is accepted that KHI's interfere with the growth of the clathrate hydrate crystal, thus preventing the formation of the hydrates.

While AA's allow the crystal to form and then disperse the small crystal, KHI's prevent the formation of hydrate crystals by disrupting the crystal growth. It is commonly accepted that AA's act as dispersants of the hydrate crystals into the hydrocarbon phase, and therefore have a limitation that the liquid hydrocarbon phase must be present. Typically the liquid hydrocarbon to water ratio should be no greater then one to one to ensure that there is enough hydrocarbon to contain the dispersed hydrate crystals. Unfortunately, this limitation reduces the opportunity in the oilfield as many wells increase the amount of water produced very rapidly after the water breakthrough is observed.

There are several important factors to consider when evaluating the capabilities and performance of a hydrate inhibitor, but the most significant and directly relevant of these are the two factors subcooling and the hold time. Subcooling refers to the degree to which the temperature of the system can be lowered below the theoretical hydrate formation temperature at a given pressure, and is often referred to in terms of a $\Delta T$ value. The hold time refers to the amount of time that this sub-cooled system can be kept hydrate-free in the presence of a particular KHI. Thus a good KHI should have a large $\Delta T$ subcooling temperature, and be capable of long hold times at that temperature.

SUMMARY OF THE INVENTION

This invention is a method of inhibiting of hydrates in a fluid comprising water, gas and optionally liquid hydrocarbon comprising treating the fluid with an effective hydrate-inhibiting amount of an inhibitor composition comprising an amphiphilic polymer prepared by polymerizing one or more N-alkyl(alkyl)acrylamide monomers in a solvent comprising one or more glycol ether solvents of formula $CH_3-(CH_2)_m-(O-CH_2-CH_2)_n-OH$ m is an integer of 0-1, and n is an integer of >1.

In another aspect, this invention is a hydrate inhibitor composition prepared by polymerizing one or more N-alkyl (alkyl)acrylamide monomers in a solvent comprising one or more glycol ether solvents of formula $CH_3-(CH_2)_m-(O-CH_2-CH_2)_n-OH$ m is an integer of 0-1, and n is an integer of $\geq 1$.

The composition and method is effective to control gas hydrate formation and plugging in hydrocarbon production and transportation systems. This chemical effectively modifies the formation of hydrate crystals so that hydrocarbon fluids can be produced from the reservoir and transported to the processing facility without the risk of hydrate blockages.

DETAILED DESCRIPTION OF THE INVENTION

As used herein, "inhibiting" includes both inhibiting and preventing the formation and agglomeration of hydrate crystals. Such crystals are sometimes referred to as "clathrate" or "clathrate hydrate" and typically have an architecture of a cage structure. The cage structure can be of many types, normally referred to as type 1, type 2, or type H.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

"AA" stands for anti-agglomerate; "AIBN" for azobisisobutyronitrile; "APS" for ammonium persulfate; "ATBS" for acrylamido tertiary butyl sulfonic acid (2-acrylamido-2-methylpropane-1-sulfonic acid); "BDG" for butyldiglycol (diethylene glycol monobutyl ether); "BPO" for benzoyl peroxide; "BuOH" for butanol (butyl alcohol); "2-BuOH" for 2-butanol; "CTA" for chain-transfer agent; "Cu" for copper; "DMAEA" for dimethylamino ethylacrylate; "DPGME" for di-propylene glycol monomethyl ether; "DTBP" for di-tert butylperoxide; "EDG" for ethyldiglycol (diethylene glycol monoethyl ether); "EGMBE" for ethylene glycol mono-butyl ether (butyl glycol ether, butoxyethanol); "EE" for 2-ethoxyethanol; "EEA" for ethoxyethanol acetate; "EtOH" for ethanol; "GOM" for Gulf of Mexico; "H-TBP" for tert-butyl hydroperoxide; "$H_2O_2$" for hydrogen peroxide; "IPA" for isopropanol (isopropyl alcohol); "IPMA" for N-isopropylmethacrylamide; "KHI" for kinetic Hydrate Inhibitor; "LDHI" for low-dosage hydrate inhibitor; "MAPTAC" for methacrylamidopropyl trimethylammonium chloride; "MEK" for methyl ethyl ketone; "MeOH" for methanol; "NaCl" for sodium chloride; "PE" for pentaerythritol; "PG" for propylene glycol; "PrOH" for 1-propanol; "Psi" for pounds per square inch; "Psia" for pounds per square inch absolute; "Psig" for pounds per square inch gauge; "THF" for tetrahydrofuran; "THI" for thermodynamic hydrate inhibitor; "TBPO" for tert-butyl peroctoate (including t-butylperoxy-2-ethylhexanoate); "TBPP" for tert-butyl peroxypivalate; and "TMP" for trimethylolpropane.

The hydrate inhibiting compositions of the invention are prepared by polymerizing one or more N-alkyl(alkyl)acrylamide monomers in a solvent comprising one or more glycol ether solvents as described herein to form a solution of a N-alkyl(alkyl)acrylamide polymer in the solvents. As used herein "N-alkyl(alkyl)acrylamide polymer" includes N-alkyl(alkyl)acrylamide homopolymers and copolymers of N-alkyl(alkyl)acrylamide with one or more comonomers.

In an embodiment, the N-alkyl(alkyl)acrylamide monomer is N-isopropyl methacrylamide.

In an embodiment, the N-alkyl(alkyl)acrylamide monomers are copolymerized with one or more comonomers.

In an embodiment, the comonomers are selected from acrylamide, alkyl substituted acrylamides, acrylic acid, alkyl substituted acrylates, N,N-dialkylacrylamides, N,N-dialkylmethacrylamides, N,N-dialkylaminoalkylacrylates and alkyl chloride quaternary salts thereof, N,N-dialkylaminoalkylmethacrylates and alkyl chloride quaternary salts thereof, N,N-dialkylaminoalkylacrylamides and alkyl chloride quaternary salts thereof, N,N-dialkylaminoalkylmethacrylamides and alkyl chloride quaternary salts thereof, hydroxyalkylacrylates, hydroxyalkylmethacrylates, acrylamido alkyl sulfonic acids and sodium or ammonium salts thereof.

In an embodiment, the comonomers are selected from methacrylamidopropyl trimethylammonium chloride, 2-(dimethylamino)ethyl methacrylate, 3-(dimethylamino)propyl methacrylamide, 2-acrylamido-2-methyl propane sulfonic acid, 2-(hydroxyethylmethacrylate, 2-acrylamido-2-methyl propane sulfonic acid sodium salt, methacryloyloxy(ethyltrimethyl)ammonium chloride, methacrylic acid and methacrylamide.

In an embodiment, the amphiphilic polymer is N-isopropyl methacrylamide homopolymer.

In an embodiment, the amphiphilic polymer comprises 70-99 mole percent N-isopropyl(meth)acrylamide repeat units and 1-30 mole percent of comonomer repeat units.

In an embodiment, the amphiphilic polymer comprises 85-95 mole percent of N-isopropyl(meth)acrylamide derived repeat units and 5-15 mole percent of comonomer derived repeat units.

In an embodiment, the amphiphilic polymer comprises 85-95 mole percent of N-isopropyl (meth)acrylamide derived repeat units and 5-15 mole percent of comonomer derived repeat units.

In an embodiment, the polymer of the invention has an average molecular weight of about 1,000 to 100,000 Dalton.

In another embodiment, the polymer of the invention has a distribution of molecular weights with about 60-100 percent in the range of 1,000 to 20,000 Dalton and about 0-25 percent in the range from 20,000 to 6,000,000 Dalton.

Glycol ether solvents suitable for use in preparing the inhibitor compositions of the invention have formula $CH_3$—$(CH_2)_m$—$(O$—$CH_2$—$CH_2)_n$—$OH$ where m is an integer of 0-1, and n is an integer greater than or equal to 1.

Glycol ether solvents suitable for use in preparing the inhibitor compositions of the invention have formula $CH_3$—$(CH_2)_m$—$(O$—$CH_2$—$CH_2)_n$—$OH$ where m is an integer of 0-1, and n is an integer greater than or equal to 1.

In an embodiment, the solvent has formula $CH_3$—$(CH_2)_m$—$(O$—$CH_2$—$CH_2)_n$—$OH$ where m is an integer of 0-1, and n is an integer from 1-4.

In an embodiment, the glycol ether solvent is diethylene glycol monoethyl ether.

In an embodiment, the solvent comprises one or more glycol ether solvents and one or more low molecular weight alcohols or glycols. Representative low molecular weight glycols and alcohols include iso-propanol, 1,1,1-tris(hydroxymethyl)propane, triethylene glycol dimethyl ether, diethylene glycol dimethyl ether, 2-ethoxyethanol, diethylene glycol monomethyl ether and ethylene glycol monobutyl ether, and the like.

In an embodiment, the solvent comprises diethylene glycol monoethyl ether and one or more solvents selected from isopropanol, 2-ethoxyethanol and 1,1,1-tris(hydroxymethyl) propane.

In a typical preparation, the N-alkyl (alkyl)acrylamide monomer(s) and any comonomers and solvent(s) are charged to a reactor and purged with nitrogen, then one or more initiators are charged to the reactor. Alternatively the initiator(s) may be charged once the reactor is heated to reaction temperature. Additional initiator may also be added near the completion of the polymerization to reduce residual monomer in the polymer composition. Once the reaction reaches reaction temperature and initiator has been charged, the reaction is heated for the requisite amount of time, then cooled to discharge the product. As most initiators described herein are thermally labile, the temperature at which they are added has a significant potential to effect the polymer molecular weight distribution. For example, higher process temperatures cause a higher rate of initiator decomposition, generally resulting in lower molecular weight polymer chains. In addition, most solvents described herein are capable of modifying the polymer end groups via temperature-dependent radical chain transfer reactions. For example, if the chain transfer reaction to solvent has a higher activation energy than the propagation reaction to produce the polymer, then higher reaction temperatures will result in a more pronounced effect of the solvent on lowering the polymer molecular weight and influencing the polymer end groups.

In an embodiment polymerization is initiated by thermal decomposition of organic peroxides such as diacyl peroxides including lauroyl peroxide, succinic acid peroxide, benzoyl peroxide, and the like; hydrogen peroxide; hyroperoxides such as t-butyl hydroperoxide; dialkylperoxides including dicumyl peroxide, di(t-butyl)peroxide, and the like; and peroxiesters including t-butylperoxypivalate, t-butylperoxy-2-ethylhexanoate, OO-(t-Butyl) O-isopropyl monoperoxycarbonate, and the like.

In an embodiment, polymerization is initiated by thermal decomposition of t-butylperoxypivalate, t-butylperoxy-2-ethylhexanoate or OO-(t-Butyl) O-isopropyl monoperoxycarbonate.

In an embodiment, polymerization is initiated by thermal decomposition of t-butylperoxy-2-ethylhexanoate.

In an alternative embodiment, polymerization is initiated by redox decomposition of hydrogen peroxide or other similar hydroperoxides with a redox co-catalyst, such as $CuSO_4$ or $Fe_2(SO_4)_3$, and the like.

The composition and method of this invention is effective to control gas hydrate formation and plugging in hydrocarbon production and transportation systems. To ensure effective inhibition of hydrates, the inhibitor composition should be injected prior to substantial formation of hydrates. A preferred injection point for petroleum production operations is downhole near the near the surface controlled sub-sea safety valve. This ensures that during a shut-in, the product is able to disperse throughout the area where hydrates will occur. Treatment can also occur at other areas in the flowline, taking into account the density of the injected fluid. If the injection point is well above the hydrate formation depth, then the hydrate inhibitor should be formulated with a solvent with a density high enough that the inhibitor will sink in the flowline to collect at the water/oil interface. Moreover, the treatment can also be used for pipelines or anywhere in the system where there is a potential for hydrate formation.

The composition is introduced into the fluid by any means suitable for ensuring dispersal of the inhibitor through the fluid being treated. Typically the inhibitor is injected using mechanical equipment such as chemical injection pumps, piping tees, injection fittings, and the like. The inhibitor mixture can be injected as prepared or formulated in an additional polar or non-polar solvents as described herein depending upon the application and requirements.

Representative polar solvents suitable for formulation with the inhibitor composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like.

Representative of non-polar solvents suitable for formulation with the inhibitor composition include aliphatics such as pentane, hexane, cyclohexane, methylcyclohexane, heptane, decane, dodecane, diesel, and the like; aromatics such as toluene, xylene, heavy aromatic naptha, fatty acid derivatives (acids, esters, amides), and the like.

The particular formulation depends upon the application of the inhibitor composition and any additional treatments that will be used in conjunction with the KHI. For example, if the inhibitor composition will be injected with a paraffin inhibitor that is typically only formulated in non-polar solvents, solvents such as diesel, heavy aromatic naphtha, fatty acid methyl esters, xylene, toluene, and the like may be used. The inhibitor composition can also be formulated in a non-polar solvent to ensure that the risk of incompatibility is minimized.

Alternatively, if the inhibitor composition will be injected with a water soluble corrosion inhibitor or scale inhibitor, a polar solvent such as methanol, ethanol, isopropanol, 2-butoxyethanol, ethylene glycol, propylene glycol, and the like, can be used.

The amount of inhibitor composition used to treat the fluid is the amount that effectively inhibits hydrate formation and/or aggregation. The amount of inhibitor added can be determined by one of skill in the art using known techniques such as, for example, the rocking cell test described herein. Typical doses of formulated inhibitors range from about 0.05 to about 5.0 volume percent, based on the amount of the water being produced although in certain instances the dosage could exceed 5 volume percent.

The inhibitor composition of this invention may be used alone or in combination with thermodynamic hydrate inhibitors and/or anti-agglomerates as well as other treatments used in crude oil production and transport including asphaltine inhibitors, paraffin inhibitors, corrosion inhibitors, scale inhibitors, emulsifiers, water clarifiers, dispersants, emulsion breakers and the like.

Accordingly, in some embodiments, this invention further comprises treating the fluid with one or more thermodynamic hydrate inhibitors or one or more anti-agglomerates, or a combination thereof. The thermodynamic hydrate inhibitors and/or anti-agglomerates may be formulated with the inhibitor composition or added to the fluid separately. Individual inhibitors may also be added to the fluid at separate ports.

The effective amount of thermodynamic hydrate inhibitor and anti-agglomerate may be empirically determined based on the characteristics of the fluid being treated, for example using the rocking cell test described herein. Typically, the ratio of thermodynamic hydrate inhibitor to inhibitor is at least about 10:1.

In other embodiments, this invention further comprises treating the fluid with one or more asphaltene inhibitors, paraffin inhibitors, corrosion inhibitors, emulsion breakers or scale inhibitors, or a combination thereof.

In another embodiment, this invention comprises treating the fluid with a composition comprising the mixture of inhibitors and one or more emulsion breakers.

The foregoing may be better understood by reference to the following Examples, which are presented for purposes of illustration and are not intended to limit the scope of the invention.

EXAMPLE 1

A representative synthesis using a lower temperature initiator addition is carried out by charging 85.7 g of N-isopropylmethacrylamide (IPMA) (available from Evonik, Darmstadt, Germany), 255.7 g of 2-ethoxyethanol, and 6.0 g tert-butyl peroctoate (0.028 moles) into a reactor capable of holding pressure. The contents of the reactor are then purged with nitrogen to deoxygenate. Once nitrogen purge is complete the reactor is blocked in and heated to 90° C. for 4 hours, after which the reaction is cooled and the product collected as a yellow/amber solution.

EXAMPLE 2

A representative synthesis using a higher temperature initiator addition is carried out by charging 100.66 g of IPMA (Evonik), and 197.8 g of ethyldiglycol into a reactor capable of holding pressure. The contents of the reactor are warmed to 35° C. and purged with nitrogen to deoxygenate. A 7.03% solution of di-tert-butyl peroxide in ethyldiglycol was prepared. The reactor is then blocked in and heated to 130° C. At 130° C., 84.8 g of peroxide solution was added to the reactor over 1 hour. The reaction was held for 1.5 hours at 130° C., then an additional 28.3 g peroxide solution was added over 1 hour, after which the reaction was held at 130° C. for an additional 2.5 hours. Then the reactor was cooled and the product collected as an yellow/amber solution.

EXAMPLE 3

A representative synthesis using short addition times of initiator is carried out by charging 24.6 g IPMA (Evonik), and 70.6 g ethyldiglycol to a round bottom flask with nitrogen purge line and condenser set up. The mixture was warmed to 40° C. and purged with nitrogen to deoxygenate. The temperature was then set to 120° C. When the temperature was increasing past the 97° C. point, 2.7 g tert-butyl peroctoate was charged to the reactor and heating continued for another 0.5 hour. Then the temperature was lowered to 95° C. and held for another 0.5 hour. Then at 95° C., 2.1 g tert-butyl peroctoate was charged to the reactor, and the temperature was increased to 122° C. The reaction was held for 1 hour, and the temperature lowered to 90° C. and held an additional 1.5 hours, after which 2.0 g tert-butyl peroctoate was charged to the reactor, and the temperature was increased to 124° C., and held for another 1 hour, then cooled and the product collected as a yellow/amber solution.

Representative polymers prepared according to the methods described herein and their properties are shown in Table 1. In Table 1, Rocking Cell (RC) data is obtained as described in Example 4 under Type 2 conditions unless otherwise indicated. Solubility data refers to turbidity where "Pass" means a turbidity reading of less than 200 NTU.

TABLE 1

Representative Polymer Compositions

| Polymer | Monomer(s) | | Solvent(s) | | Initiators | | Temp (° C.) | Time (h) | RC Test | Sol. Test |
|---|---|---|---|---|---|---|---|---|---|---|
| 1 | IPMA | | EDG | | d-TBP | | >100 | 6 | Fail | Pass |
| 2 | IPMA | | EDG | IPA | d-TBP | | >100 | 8 | Fail | Pass |
| 3 | IPMA | | IPA | | d-TBP | APS | >100 | 9 | Pass (T1/T2) | Pass |
| 4 | IPMA | | IPA | | d-TBP | | >100 | 24 | Fail | Pass |
| 5 | IPMA | | IPA | | TBPO | | >100 | 6 | Fail | Pass |
| 6 | IPMA | | EDG | | TBPO | | >100 | 4.5 | Pass (T1/T2) | Pass |
| 7 | IPMA | | EDG | | TBPO | H$_2$O$_2$/Cu | >100 | 8 | Pass (T1/T2) | Pass |
| 8 | IPMA | | EDG | | H$_2$O$_2$/Cu | TBPO | >100 | 8 | Pass | Pass |
| 9 | IPMA | | EDG | | H$_2$O$_2$/Cu | | >100 | 6 | Fail | Pass |
| 10 | IPMA | | EDG | IPA | H$_2$O$_2$/Cu | | <100 | 6 | Pass | Pass |
| 11 | IPMA | | EGMBE | | TBPO | | <100 | 5 | Pass | Fail |
| 12 | IPMA | | EE | | TBPO | | <100 | 4 | Pass | Fail |
| 13 | IPMA | | EE | | TBPO | | <100 | 4 | Pass | Pass |
| 14 | IPMA | | EE | TMP | TBPO | | <100 | 3.5 | Pass | Fail |
| 15 | IPMA | | EE | | TBPO | | <100 | 5 | Pass | Pass |
| 16 | IPMA | | Diglyme | | TBPO | | <100 | 6 | Pass | Fail |
| 17 | IPMA | | EGMBE | TMP | TBPO | | <100 | 6 | Pass | Fail |
| 18 | IPMA | ATBS | EE | | TBPO | | <100 | 5 | Pass | Pass |
| 19 | IPMA | NaATBS | EE | | TBPO | | <100 | 5 | Pass | Pass |
| 20 | IPMA | MAPTAC | EE | | TBPO | | <100 | 5 | Pass | Pass |
| 21 | IPMA | | EDG | IPA | TBHP/Cu | | <100 | 6 | Fail | Pass |
| 22 | IPMA | | EDG | | TBPP | | >100 | 8 | Pass | Pass |
| 23 | IPMA | | EDG | IPA | H$_2$O$_2$/Cu | | <100 | 8 | Pass | Pass |
| 24 | IPMA | | EDG | IPA | TBPO | H$_2$O$_2$/Cu | <100 | 8 | Pass | Pass |
| 25 | IPMA | | EDG | | TBPO | | >100 | 4.5 | Pass | Fail |

EXAMPLE 4

Rocking Cell Test

The tests summarized in the tables below are performed in high pressure rocking cells. The testing conditions (pressure, temperature, oil, brine, water cut, etc.) are noted in Tables 1-4. Test results are shown in Tables 5-8.

Representative KHI's are tested under simulated field conditions. The fluids tested are shown in Table 2, the compositions of the fluids are shown in Table 3 and 4 and the test conditions are shown in Table 5. The KHI solution used was charged to the testing fluids as 3% of a 20% solution.

TABLE 2

Test Fluids

| Phase | Composition | Volume |
|---|---|---|
| Oil: | 25% Synthetic Condensate | 12 mL total liquid volume |
| Water: | 72% of total liquid volume | |
| Brine: | 0.5% NaCl used | |
| Gas: | Synthetic gas (Table 3) | |

TABLE 3

Synthetic gas composition - Type 2

| Component | mol % | Component | mol % |
|---|---|---|---|
| Nitrogen | 0.39% | iso-Butane | 0.49% |
| Methane | 87.26% | n-Butane | 0.79% |
| Ethane | 7.57% | iso-Pentane | 0.20% |
| Propane | 3.10% | n-Pentane | 0.20% |

TABLE 4

Synthetic gas composition - Type 1

| Component | mol % |
|---|---|
| Nitrogen | 037% |
| Carbon Dioxide | 0.13 |
| Methane | 99.00% |
| Ethane | 0.0.47% |
| Propane | 0.030% |

TABLE 5

Test Conditions

| | |
|---|---|
| Initial charge pressure: | 1600 psi |
| Final test pressure: | 1600 psi |
| Initial start-up temperature: | 25° C. |
| Final test temperature: | 6° C. |
| Temperature ramp down time: | Less then 2 hours |
| Inhibitor concentration: | 0-5 vol % based on the amount of water |

The testing is carried out on a rocking cell apparatus as described in Dendy, Sloan E, *Clathrate Hydrates of Natural Gases*, Second Edition, Revised and Expanded, 1997, and Talley, Larry D. et al., "Comparison of laboratory results on hydrate induction rates in a THF rig, high-pressure rocking cell, miniloop, and large flowloop", *Annals of the New York Academy of Sciences,* 2000, 314-321 According to the following protocol.

Note that for all tests, a "Pass" test must have a hold time of four hours or greater. Any test result below four hours is labeled as a "Fail".

The significance of these rankings and pass/fail criteria relate to the chemical's ability to prevent hydrate plugs from forming in any part of an oil or gas production system. Any ranking lower than 4 would be perceived as a potential risk of hydrate plugging.

EXAMPLE 4A

As noted previously, the solubility of the IPMA homopolymer has been inversely linked to KHI performance. However, the polymer solubility can be improved by incorporating appropriate amounts of co-monomers into the polymer chain, but care must be taken to minimize the amount of comonomer for enhanced solubility so that performance is retained with respect to the less soluble homopolymer analogue.

Copolymers of IPMA and representative cationic and anionic comonomers are prepared according to the methods described herein. The effect the comonomers on polymer molecular weight, handling properties, and KHI performance is shown in Table 6. The solubility of the polymer in water is tested by mixing 0.6 gm of the polymer product solution with 20 ml of water and then measured on a turbidity meter giving a reading in NTU (turbidity units).

TABLE 6

Effect of Comonomers

| Polymer | Comonomer | Mw | PDI | Viscosity cP | Turbidity NTU | RC Test |
|---|---|---|---|---|---|---|
| 26 | | 18,000 | 3.8 | 40 | >400 | Pass |
| 18 | ATBS | 26,000 | 3.2 | 110 | 89.9 | Pass |
| 19 | NaATBS | 33,000 | 3.4 | 160 | 66.13 | Pass |
| 20 | MAPTAC | 24,000 | 3.0 | 40.5 | 67.47 | Pass |

EXAMPLE 4B

The solubility of the IPMA homopolymer has been inversely linked to KHI performance. The solubility of the polymer in water can vary significantly and depends on several factors, including polymer molecular weight, size and hydrophobicity of the end group, and the charge, polarity, and ratio of any comonomer present.

Poly IPMA is prepared using various initiator systems according to the methods described herein. Table 7 shows several examples of how variations in the choice of initiator can effect polymer molecular weight, solubility, handling, and performance.

TABLE 7

Effect of initiators

| Polymer | Initiator | Mw | PDI | Solubility | RC Test Pass/Fail | Hold Time |
|---|---|---|---|---|---|---|
| 1 | d-TBP | 9600 | 3.7 | Pass | Pass | 10 |
| 6 | TBPO | 9300 | 2.8 | Pass | Pass | 80 |
| 21 | TBHP | 4800 | 2.7 | Pass | Fail | 9.4 |
| 22 | TBPP | 11000 | 4.4 | Pass | Pass | 25 |
| 10 | $H_2O_2$ | 4000 | 2.7 | Pass | Fail | 5 |

EXAMPLE 4E

Table 9 shows some examples of how variations in the solvent can effect the monomer conversion, molecular weight, handling, and performance of poly IPMA.

Several solvent comparisons are investigated. A standard glycol ether such as EGMBE or EDG is used as the polymerization solvent, and similar batches are included in which a low molecular weight alcohol was added to function as a chain transfer agent to control molecular weight and to add the appropriate hydrophobicity to the polymer chains. As shown in Table 8, KHI performance improves with the increasing weight fraction of low molecular weight alcohol.

Ethyldiglycol is a preferred solvent for several reasons including its relatively low toxicity compared with similar glycol ethers, and its high boiling point and corresponding low vapor pressure.

TABLE 8

Effect of Solvent

| Polymer | Solvent | Monomer conversion | Mw | PDI | Solubility | RC Test |
|---|---|---|---|---|---|---|
| 5 | IPA | 63 | 12000 | 6.9 | Pass | Fail |
| 11 | EGMBE | 92 | 29000 | 4.9 | Fail | Pass |
| 12 | EE | 90 | 18000 | 3.8 | Fail | Pass |
| 14 | EE/TMP | 94.5 | 19000 | 2.7 | Fail | Pass |
| 17 | EGMBE/TMP | 96 | 17000 | 4.5 | Fail | Pass |
| 16 | Diglyme | 91.5 | 8500 | 2.5 | Fail | Pass |
| 7 | EDG | 99 | 9300 | 2.8 | Pass | Pass |
| 24 | EDG/IPA | 99 | 7200 | 4.6 | Pass | Pass |

While the present invention is described above in connection with representative or illustrative embodiments, these embodiments are not intended to be exhaustive or limiting of the invention. Rather, the invention is intended to cover all alternatives, modifications and equivalents included within its spirit and scope, as defined by the appended claims.

The invention claimed is:

1. A method of inhibiting hydrates in a fluid comprising water, gas and optionally liquid hydrocarbon comprising treating the fluid with an effective hydrate-inhibiting amount of an inhibitor composition comprising a polymer prepared by polymerizing one or more N-alkyl (alkyl)acrylamide monomers in a solvent comprising one or more glycol ether solvents of formula $CH_3-(CH_2)_m-(O-CH_2-CH_2)_n-OH$ where m is an integer of 0-1, and n is an integer from 1 to 4, wherein the solvent modifies at least one end group of the polymer and wherein said polymer has a distribution of molecular weights with about 60-100 percent in the range of 1,000 to 20,000 Dalton and about 0-25 percent in the range from 20,000 to 6,000,000 Dalton, has the property of maintaining a hold time of four hours or greater in a high pressure rocking cell test using test conditions of 1600 psi, an initial temperature of 25° C., a final temperature of 6° C., and a temperature ramp down time of less than two hours and a test fluid containing 25% oil, 72% water, 2.5% gas, and 0.5% sodium chloride, and achieves a solubility in aqueous solution of less than 200 nephelometric turbidity units (NTU).

2. The method of claim 1 wherein said N-alkyl (alkyl)acrylamide monomer is N-isopropyl (meth)acrylamide.

3. The method of claim 2 further comprising a free radical forming condition initiated by thermal decomposition of one or more peroxides.

4. The method of claim 3 wherein said peroxides are selected from diacyl peroxides, hydrogen peroxide, hydroperoxides, dialkylperoxides and peroxyesters.

5. The method of claim 4 wherein said peroxyesters are selected from t-butylperoxypivalate, t-butylperoxy-2-ethylhexanoate and OO-(t-butyl) O-isopropyl monoperoxycarbonate.

6. The method of claim 4 where the peroxyester is t-butyl peroctoate.

7. The method of claim 3 wherein said free radical forming conditions are initiated by redox decomposition of hydrogen peroxide or similar hydroperoxide with the redox co-catalyst.

8. The method of claim 2 wherein the polymer is N-isopropyl (meth)acrylamide homopolymer.

9. The method of claim 2 wherein said polymer is a copolymer of N-isopropyl (meth)acrylamide and one or more comonomers selected from acrylamide, alkyl substituted acrylamides, acrylic acid, alkyl substituted acrylates, N,N-dialkylacrylamides, N,N-dialkylmethacrylamides, N,N-dialkylaminoalkylacrylates and alkyl chloride quaternary salts thereof, N,N-dialkylaminoalkylmethacrylates and alkyl chloride quaternary salts thereof, N,N-dialkylaminoalkylacrylamides and alkyl chloride quaternary salts thereof, N,N-dialkylaminoalkylmethacrylamides and alkyl chloride quaternary salts thereof, hydroxyalkylacrylates, hydroxyalkylmethacrylates, or acrylamido alkyl sulfonic acids and sodium or ammonium salts thereof.

10. The method of claim 9 wherein the comonomers are selected from methacrylamidopropyl trimethylammonium chloride, 2-(dimethylamino)-ethyl methacrylate, 3-(dimethylamino)propyl methacrylamide, 2-acrylamido-2-methyl propane sulfonic acid, 2-(hydroxyethyl)methacrylate, 2-acrylamido-2-methyl propane sulfonic acid sodium salt, methacryloyloxy(ethyltrimethyl)ammonium chloride, methacrylic acid and methacrylamide.

11. The method of claim 9 wherein said polymer comprises 70-99 mole percent N-isopropyl (meth)acrylamide repeat units and 1-30 mole percent of comonomer repeat units.

12. The method of claim 9 wherein said polymer comprises 85-95 mole percent N-isopropyl (meth)acrylamide derived repeat units and 5-15 mole percent of comonomer derived repeat units.

13. The method of claim 1 wherein said solvent further comprises one or more low molecular weight alcohols or glycol ethers.

14. The method of claim 13 wherein said low molecular weight alcohols or glycol ethers are selected from isopropanol, 1,1,1-tris(hydroxymethyl) propane, triethylene glycol dimethyl ether, diethylene glycol dimethyl ether, 2-ethoxyethanol, diethylene glycol monomethyl ether and ethylene glycol monobutyl ether.

15. The method of claim 1 wherein said glycol ether solvent is diethylene glycol monoethyl ether.

16. The method of claim 1 wherein said solvent comprises diethylene glycol monoethyl ether and one or more solvents selected from isopropanol, 2-ethoxyethanol and 1,1,1-tris (hydroxymethyl) propane.

17. The method of claim 16 where diethylene glycol monoethyl ether comprises 50%-99% of the solvent and additional solvents comprise 1%-50% of the solvent.

18. The method of claim 1 wherein said hydrates comprise hydrates of type 1, type 2, and/or type H.

19. The method of claim 1, further comprising initiating polymerization of the one or more N-alkyl (alkyl)acrylamide monomers by redox decomposition of a peroxide with a redox co-catalyst.

20. The method of claim 19, wherein the redox co-catalyst is $CuSO_4$.

21. The method of claim 19, wherein the redox co-catalyst is $Fe_2(SO_4)_3$.

22. A hydrate inhibitor composition comprising one or more N-alkyl (alkyl)acrylamide polymers polymerized through initiation by redox decomposition of a peroxide with a redox co-catalyst and in a solvent comprising one or more glycol ether solvents of formula $CH_3-(CH_2)_m-(O-CH_2-CH_2)_n-OH$ where m is an integer of 0-1, and n is an integer from 1 to 4, wherein the solvent modifies at least one end group of the polymer and wherein said polymer has a distribution of molecular weights with about 60-100 percent in the range of 1,000 to 20,000 Dalton and about 0-25 percent in the range from 20,000 to 6,000,000 Dalton, has the property of maintaining a hold time of four hours or greater in a high pressure rocking cell test using test conditions of 1600 psi, an initial temperature of 25° C., a final temperature of 6° C., and a temperature ramp down time of less than two hours and a test fluid containing 25% oil, 72% water, 2.5% gas, and 0.5% sodium chloride, and achieves a solubility in aqueous solution of less than 200 nephelometric turbidity units.

23. A method of inhibiting hydrates in a fluid comprising water, gas and optionally liquid hydrocarbon comprising treating the fluid with an effective hydrate-inhibiting amount of an inhibitor composition comprising a polymer prepared by polymerizing one or more N-alkyl (alkyl)acrylamide monomers in a solvent comprising one or more glycol ether solvents of formula $CH_3-(CH_2)_m-(O-CH_2-CH_2)_n-OH$ where m is an integer of 0-1, and n is an integer from 1 to 4, wherein the solvent modifies at least one end group of the polymer and wherein said polymer has a distribution of molecular weights with about 60-100 percent in the range of 1,000 to 20,000 Dalton and about 0-25 percent in the range from 20,000 to 6,000,000 Dalton and achieves a solubility in aqueous solution of less than 200 nephelometric turbidity units (NTU), and said polymer is a copolymer of said one or more N-alkyl (alkyl)acrylamide monomers and one or more comonomers selected from acrylamide, an alkyl substituted acrylamide, acrylic acid, an alkyl substituted acrylate, an N,N-dialkylacrylamide, an N,N-dialkylmethacrylamide, an N,N-dialkylaminoalkylacrylate or an alkyl chloride quaternary salt thereof, an N,N-dialkylaminoalkylmethacrylate or an alkyl chloride quaternary salt thereof, an N,N-dialkylaminoalkylacrylamide or an alkyl chloride quaternary salt thereof, an N,N-dialkylaminoalkylmethacrylamide or an alkyl chloride quaternary salt thereof, a hydroxyalkylacrylate, a hydroxyalkylmethacrylate, or an acrylamido alkyl sulfonic acid or a sodium or ammonium salt thereof.

24. A hydrate inhibitor composition comprising one or more N-alkyl (alkyl)acrylamide polymers polymerized through initiation by redox decomposition of a peroxide with a redox co-catalyst and in a solvent comprising one or more glycol ether solvents of formula $CH_3-(CH_2)_m-(O-CH_2-CH_2)_n-OH$ where m is an integer of 0-1, and n is an integer from 1 to 4, wherein the solvent modifies at least one end group of the polymer and wherein said polymer has a distribution of molecular weights with about 60-100 percent in the range of 1,000 to 20,000 Dalton and about 0-25 percent in the range from 20,000 to 6,000,000 Dalton, and achieves a solubility in aqueous solution of less than 200 nephelometric turbidity units, and said polymer is a copolymer of one or more N-alkyl (alkyl)acrylamide monomers and one or more comonomers selected from acrylamide, an alkyl substituted acrylamide, acrylic acid, an alkyl substituted acrylate, an N,N-dialkylacrylamide, an N,N-dialkylmethacrylamide, an N,N-dialkylaminoalkylacrylate or an alkyl chloride quaternary salt thereof, an N,N-dialkylaminoalkylmethacrylate or an alkyl chloride quaternary salt thereof, an N,N-dialkylaminoalkylacrylamide or an alkyl chloride quaternary salt thereof, an N,N-dialkylaminoalkylmethacrylamide or an alkyl chloride quaternary salt thereof, a hydroxyalkylacrylate, a hydroxyalkylmethacrylate, or an acrylamido alkyl sulfonic acid or a sodium or ammonium salt thereof.

\* \* \* \* \*